(12) United States Patent
Hundemer et al.

(10) Patent No.: US 10,021,433 B1
(45) Date of Patent: Jul. 10, 2018

(54) VIDEO-PRODUCTION SYSTEM WITH SOCIAL-MEDIA FEATURES

(71) Applicant: Tribune Broadcasting Company, LLC, Chicago, IL (US)

(72) Inventors: Hank J. Hundemer, Bellevue, KY (US); Dana Lasher, Morgan Hill, CA (US)

(73) Assignee: Tribune Broadcasting Company, LLC, Chicago, IL (US)

(*) Notice: Subject to any disclaimer, the term of this patent is extended or adjusted under 35 U.S.C. 154(b) by 0 days.

(21) Appl. No.: 15/295,886

(22) Filed: Oct. 17, 2016

Related U.S. Application Data

(60) Provisional application No. 62/242,593, filed on Oct. 16, 2015.

(51) Int. Cl.
| | | |
|---|---|---|
| *H04N 7/10* | (2006.01) | |
| *H04N 21/234* | (2011.01) | |
| *H04N 21/44* | (2011.01) | |
| *H04N 21/442* | (2011.01) | |
| *H04N 21/81* | (2011.01) | |
| *H04N 21/439* | (2011.01) | |
| *H04N 21/488* | (2011.01) | |

(52) U.S. Cl.
CPC ... *H04N 21/23424* (2013.01); *H04N 21/4394* (2013.01); *H04N 21/44008* (2013.01); *H04N 21/44209* (2013.01); *H04N 21/4884* (2013.01); *H04N 21/8126* (2013.01)

(58) Field of Classification Search
CPC ......... H04N 21/23424; H04N 21/4884; H04N 21/4394; H04N 21/44209; H04N 21/44008; H04N 21/8126

USPC .......................................................... 725/32
See application file for complete search history.

(56) References Cited

U.S. PATENT DOCUMENTS

| | | | | |
|---|---|---|---|---|
| 5,510,848 A | * | 4/1996 | Nocturne | H04N 5/4401 348/556 |
| 5,991,799 A | * | 11/1999 | Yen | G06F 17/30867 707/E17.109 |

(Continued)

FOREIGN PATENT DOCUMENTS

| | | |
|---|---|---|
| WO | 2013163742 A1 | 11/2013 |
| WO | 2015038516 A1 | 3/2015 |

OTHER PUBLICATIONS https://en.wikipedia.org/wiki/Meerkat_(app); Wikipedia Article on Meerkat (app); published May 29, 2015; retrieved Sep. 28, 2016.

(Continued)

*Primary Examiner* — Michael B Pierorazio
(74) *Attorney, Agent, or Firm* — McDonnell Boehnen Hulbert & Berghoff LLP

(57) ABSTRACT

In one aspect, an example method includes (i) receiving, by a computing system, a data stream representing a media content item followed by a social media (SM) content item, (ii) performing, by the computing system, an analysis of a data rate of the data stream, (iii) determining, by the computing system based on the analysis, a demarcation point in the data stream between the media content item and the SM content item, and (iv) integrating, by the computing system using the demarcation point, the SM content item without the media content item into a video program.

20 Claims, 9 Drawing Sheets

(56) References Cited

U.S. PATENT DOCUMENTS

| | | | |
|---|---|---|---|
| 6,208,691 B1* | 3/2001 | Balakrishnan | H04N 21/23406 348/700 |
| 7,299,275 B2* | 11/2007 | Tsukidate | H04N 7/17354 348/E7.075 |
| 7,369,749 B2* | 5/2008 | Ichioka | G11B 27/036 348/E5.097 |
| 7,603,683 B2* | 10/2009 | Reto | H04L 29/06027 709/204 |
| 7,653,921 B2* | 1/2010 | Herley | H04N 7/16 382/100 |
| 7,712,125 B2* | 5/2010 | Herigstad | H04N 7/163 725/109 |
| 7,734,579 B2* | 6/2010 | White | H04N 5/76 707/609 |
| RE41,968 E* | 11/2010 | Washino | G06F 3/14 348/722 |
| 7,908,625 B2* | 3/2011 | Robertson | H04L 12/2838 348/552 |
| 8,307,395 B2* | 11/2012 | Issa | G06F 17/30817 709/219 |
| 8,490,133 B1* | 7/2013 | Parekh | H04N 21/6175 725/44 |
| 8,516,345 B2* | 8/2013 | Quere | H04N 21/2383 714/776 |
| 8,621,508 B2* | 12/2013 | Rowe | G11B 27/031 725/109 |
| 8,631,452 B2* | 1/2014 | Xu | H04N 7/17318 375/240.27 |
| 8,713,195 B2* | 4/2014 | Pickens | H04L 1/004 709/231 |
| 8,806,563 B2* | 8/2014 | Coufal | H04N 7/16 370/221 |
| 8,839,295 B2* | 9/2014 | Kim | H04N 21/26283 725/40 |
| 8,881,220 B2* | 11/2014 | Arya | H04N 21/2365 725/118 |
| 9,049,386 B1 | 6/2015 | Hundemer | |
| 9,226,022 B2* | 12/2015 | Ferguson | H04N 7/17318 |
| 2002/0054244 A1* | 5/2002 | Holtz | G06F 3/0481 348/722 |
| 2003/0061206 A1* | 3/2003 | Qian | G06F 17/30035 |
| 2003/0063217 A1* | 4/2003 | Smith | H04N 7/088 348/460 |
| 2004/0103426 A1* | 5/2004 | Ludvig | H04H 20/86 725/9 |
| 2004/0148571 A1* | 7/2004 | Lue | G06F 17/30905 715/239 |
| 2004/0215718 A1* | 10/2004 | Kazmi | H04L 65/4084 709/203 |
| 2005/0144455 A1* | 6/2005 | Haitsma | G06F 17/30743 713/176 |
| 2005/0262542 A1* | 11/2005 | DeWeese | H04L 12/1818 725/106 |
| 2006/0031883 A1* | 2/2006 | Ellis | H04N 7/163 725/58 |
| 2006/0031889 A1* | 2/2006 | Bennett | H04L 29/06027 725/80 |
| 2006/0190966 A1* | 8/2006 | McKissick | G06Q 30/02 725/61 |
| 2007/0124756 A1* | 5/2007 | Covell | G06F 17/30743 725/18 |
| 2007/0157281 A1* | 7/2007 | Ellis | H04N 7/17309 725/134 |
| 2007/0204285 A1* | 8/2007 | Louw | G06F 17/30867 725/14 |
| 2008/0027953 A1* | 1/2008 | Morita | G11B 27/11 |
| 2008/0059532 A1* | 3/2008 | Kazmi | G06F 21/10 |
| 2008/0060036 A1* | 3/2008 | Cox | G06F 17/30017 725/110 |
| 2008/0077568 A1* | 3/2008 | Ott | G06F 17/30864 |
| 2008/0170630 A1* | 7/2008 | Falik | H04L 47/2416 375/240.29 |
| 2008/0215170 A1* | 9/2008 | Milbrandt | G06F 17/30749 700/94 |
| 2008/0235733 A1* | 9/2008 | Heie | H04N 7/163 725/46 |
| 2009/0037954 A1* | 2/2009 | Nagano | H04H 60/72 725/39 |
| 2009/0119708 A1* | 5/2009 | Harrar | G06F 8/38 725/39 |
| 2009/0183201 A1* | 7/2009 | Dasgupta | G09B 7/00 725/40 |
| 2009/0320058 A1* | 12/2009 | Wehmeyer | H04N 7/17336 725/31 |
| 2009/0320060 A1* | 12/2009 | Barrett | H04N 7/165 725/32 |
| 2009/0320072 A1* | 12/2009 | McClanahan | H04N 5/44543 725/47 |
| 2009/0320073 A1* | 12/2009 | Reisman | G06F 17/30873 725/51 |
| 2009/0328085 A1* | 12/2009 | Beyabani | G06Q 30/02 725/9 |
| 2010/0050203 A1* | 2/2010 | Yamagishi | G06Q 30/0241 725/22 |
| 2010/0121849 A1 | 5/2010 | Goeldi | |
| 2010/0121936 A1* | 5/2010 | Liu | H04N 5/44543 709/217 |
| 2010/0131385 A1* | 5/2010 | Harrang | G06Q 30/00 705/26.1 |
| 2010/0251292 A1* | 9/2010 | Srinivasan | H04H 20/57 725/37 |
| 2010/0296487 A1* | 11/2010 | Karaoguz | H04W 84/045 370/332 |
| 2010/0333148 A1* | 12/2010 | Musha | H04N 21/23406 725/81 |
| 2011/0040760 A1 | 2/2011 | Fleischman et al. | |
| 2011/0066744 A1* | 3/2011 | Del Sordo | H04N 21/235 709/231 |
| 2011/0068899 A1* | 3/2011 | Ioffe | G05B 15/02 340/8.1 |
| 2011/0086619 A1* | 4/2011 | George | H04M 1/72533 455/414.1 |
| 2011/0138064 A1* | 6/2011 | Rieger | G06F 17/30905 709/228 |
| 2011/0179462 A1* | 7/2011 | Kubo | H04L 43/0811 725/110 |
| 2011/0191439 A1* | 8/2011 | Dazzi | G06F 15/16 709/217 |
| 2011/0191446 A1* | 8/2011 | Dazzi | G06F 15/16 709/219 |
| 2012/0110429 A1 | 5/2012 | Tzonis et al. | |
| 2012/0110614 A1* | 5/2012 | Whitley | H04N 21/00 725/32 |
| 2012/0117590 A1* | 5/2012 | Agnihotri | H04N 21/25816 725/30 |
| 2012/0144435 A1* | 6/2012 | Spilo | H04N 5/76 725/78 |
| 2012/0278725 A1* | 11/2012 | Gordon | H04N 21/2665 715/738 |
| 2012/0291079 A1* | 11/2012 | Gordon | H04N 21/2665 725/109 |
| 2012/0331496 A1 | 12/2012 | Copertino et al. | |
| 2013/0132861 A1 | 5/2013 | Kienzle et al. | |
| 2013/0268962 A1* | 10/2013 | Snider | H04N 21/8547 725/32 |
| 2013/0268973 A1* | 10/2013 | Archibong | G06Q 50/01 725/51 |
| 2013/0304818 A1 | 11/2013 | Brumleve et al. | |
| 2014/0040243 A1 | 2/2014 | Rubinstein et al. | |
| 2014/0040371 A1 | 2/2014 | Gurevich et al. | |
| 2014/0067828 A1* | 3/2014 | Archibong | H04L 65/4084 707/748 |
| 2014/0125703 A1* | 5/2014 | Roveta | G06T 19/006 345/633 |
| 2014/0280564 A1* | 9/2014 | Darling | G06Q 50/01 709/204 |
| 2015/0039608 A1* | 2/2015 | Basilico | G06F 17/3053 707/734 |

(56) References Cited

U.S. PATENT DOCUMENTS

2015/0100586 A1* 4/2015 Caruso ............... G06F 17/3089
707/747
2015/0163354 A1  6/2015 Nezarati et al.
2015/0286716 A1* 10/2015 Snibbe .............. G06F 17/30026
707/610

OTHER PUBLICATIONS https://en.wikipedia.org/wiki/Periscope_(app); Wikipedia Article on Periscope (app); published May 26, 2015; retrieved Sep. 28, 2016.
https://about.tagboard.com/live; Tagboard Live Webpage; published Mar. 15, 2015; retrieved Sep. 28, 2016.
https://techcrunch.com/2013/11/25/tagboard-2-0/; Tagboard Revamps Its Cross-Platform Hashtag Aggregator; Anthony Ha; published Nov. 25, 2013; retrieved Sep. 28, 2016.
https://beta.stringr.com; Stringr Homepage; published Apr. 13, 2015; retrieved Sep. 28, 2016.
https://www.vidpresso.com/social; Vidpresso Social Homepage; published Jun. 27, 2015; retrieved Sep. 28, 2016.
https://techcrunch.com/2013/04/03/vidpresso-adds-photo-touch-screen-support-to-help-bring-twitter-to-tv/; Vidpresso Adds Photo, Touchscreen Support to Help Bring Twitter to TV; Ryan Lawler; published Apr. 3, 2013; retrieved Sep. 28, 2016.
https://techcrunch.com/2012/05/07/vidpresso-wants-to-help-tv-stations-put-your-tweets-and-facebook-comments-on-air/; Vidpresso Wants to Help TV Stations Put Your Tweets and Facebook Comments on Air; Frederic Lardinois; published May 7, 2012; retrieved Sep. 28, 2016.
https://techcrunch.com/2014/03/03/vidpresso-ads/; Ads to Broadcast TV; Ryan Lawler; published Mar. 3, 2014; retrieved Sep. 28, 2016.

* cited by examiner

| Story Title | Video Content Item Identifier | Duration | DVE Template Identifer(s) |
|---|---|---|---|
| STORY A | VCI ID A | 00:02:00:00 | DVE/T ID A, DVE/T ID B |
| STORY B | VCI ID B | 00:01:30:00 | |
| STORY C | | 00:00:30:00 | |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | DVE/T ID F, DVE/T ID G |
| STORY G | | 00:01:30:00 | |
| STORY H | VCI ID H | 00:00:30:00 | |
| STORY I | VCI ID I | 00:00:30:00 | |

VIDEO-PRODUCTION SYSTEM WITH SOCIAL-MEDIA FEATURES

RELATED DISCLOSURES

This disclosure claims priority to U.S. Provisional Patent Application No. 62/242,593, titled "Video Production System with Content-Related Features," filed on Oct. 16, 2015, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a computing system, a data stream representing a media content item followed by a social media (SM) content item, (ii) performing, by the computing system, an analysis of a data rate of the data stream, (iii) determining, by the computing system based on the analysis, a demarcation point in the data stream between the media content item and the SM content item, and (iv) integrating, by the computing system using the demarcation point, the SM content item without the media content item into a video program.

In another aspect, an example non-transitory computer-readable medium is disclosed. The computer-readable medium has stored thereon program instructions that upon execution by a processor, cause performance of a set of acts including (i) receiving, by the computing system, a data stream representing a media content item followed by a SM content item, (ii) performing, by the computing system, an analysis of a data rate of the data stream, (iii) determining, by the computing system based on the analysis, a demarcation point in the data stream between the media content item and the SM content item, and (iv) integrating, by the computing system using the demarcation point, the SM content item without the media content item into a video program.

In another aspect, an example computing system is disclosed. The computing system is configured for performing a set of acts including (i) receiving, by the computing system, a data stream representing a media content item followed by a SM content item, (ii) performing, by the computing system, an analysis of a data rate of the data stream, (iii) determining, by the computing system based on the analysis, a demarcation point in the data stream between the media content item and the SM content item, and (iv) integrating, by the computing system using the demarcation point, the SM content item without the media content item into a video program.

BRIEF DESCRIPTION OF THE DRAWINGS

FIG. 6 is a simplified block diagram of an example program schedule.

DETAILED DESCRIPTION

I. Overview

Figure 1:
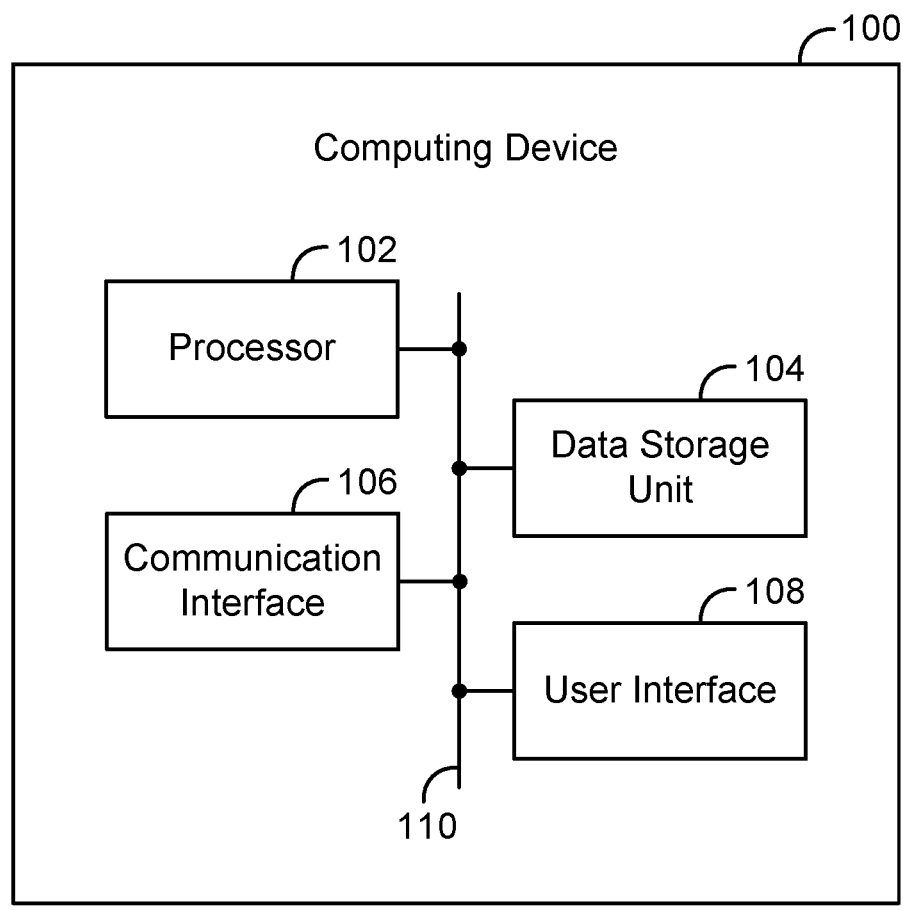
FIG. 1 is a simplified block diagram of an example computing device.

A video-production system (VPS) can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a SM system, a first DVE system, a video source, a second DVE system, a scheduling system, and a sequencing system.

The SM system can obtain a SM content item, and can transmit the SM content item to the first DVE system. The first DVE system can receive the SM content item and can execute a DVE, which causes the first DVE system to generate first video content that includes the received SM content item. The first DVE system can then transmit the first video content to the second DVE system.

The video source can generate second video content, and can transmit the second video content to the second DVE system.

The second DVE system can receive the first video content and the second video content, and can execute a DVE, which causes the DVE system to overlay the first video content on the second video content, thereby generating third video content. The third video content can serve as or be part of a video program. Thus, in this way, the VPS can integrate a SM content item into a video program.

The scheduling system can create a program schedule, perhaps based on input received from a user (e.g., a producer or technical director) via a user interface. The sequencing system can process records in the program schedule, and based on the processed records, can control one or more components of the VPS, such as the SM system, the first DVE system, the video source, and the second DVE system, to facilitate generating video content.

In one example, the VPS can obtain a SM content item from a SM platform. In some instances, a SM server (or other computing system associated with the SM platform) can transmit the SM content item to the VPS by transmitting a data stream representing the SM content item. As such, the VPS can receive the SM content item by receiving the data stream representing the SM content item.

In some instances though, the data stream can represent more than just the SM content item. For example, the data stream can also include another media content item, which may precede the SM content item in the data stream. The media content item can be, for instance, an advertisement.

Although the data stream represents the media content item followed by the SM content item, the VPS can integrate into a video program the SM content item without the media content item. To do so, the VPS can perform an analysis of the data stream to determine a data rate of the data stream and, based on the analysis of the data rate, the VPS can determine a demarcation point in the data stream between the media content item and the SM content item. For example, in a scenario in which the data rate for the media content item is different than the data rate for the SM content item, the computing system can determine the demarcation point by detecting a change in the data rate of the data stream.

The VPS can then use the demarcation point to integrate the SM content item into the video program without the preceding media content item. For example, the VPS can use the demarcation point to cue up the start of the SM content item in the data stream and then play the data stream while executing a DVE.

In another example, the computing system can store the SM content item and the demarcation point in a data storage unit so that the computing system can later integrate the stored SM content item into the video program.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
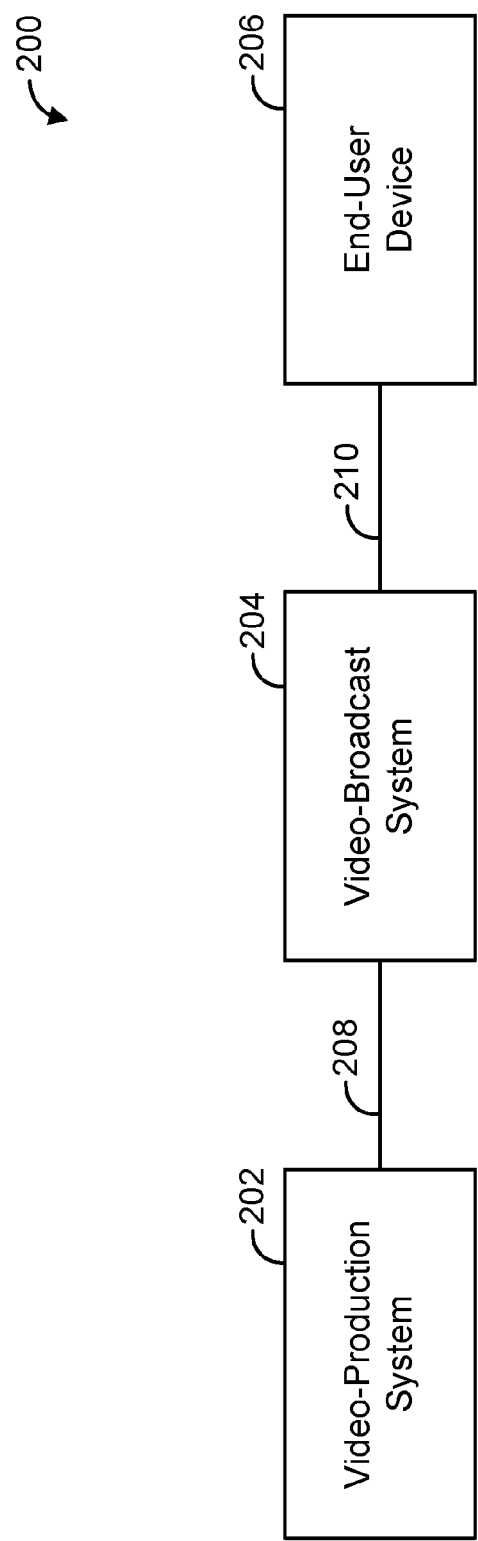
FIG. 2 is a simplified block diagram of an example video system.

FIG. 2 is a simplified block diagram of an example video system 200. The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
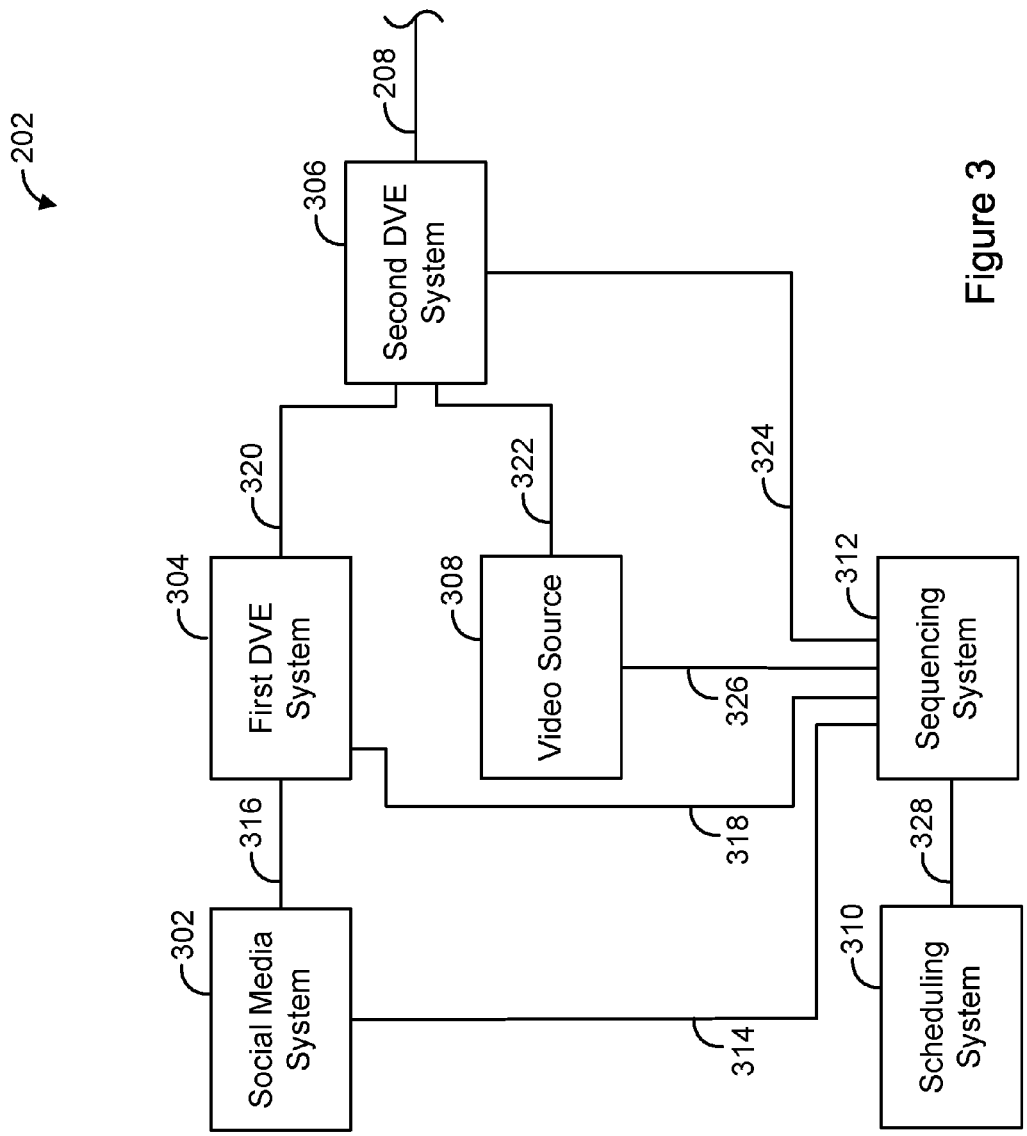
FIG. 3 is a simplified block diagram of an example video-production system.

FIG. 3 is a simplified block diagram of an example VPS 202. The VPS 202 can include various components, such as a SM system 302, a first DVE system 304, a second DVE system 306, a video source 308, a scheduling system 310, and a sequencing system 312, each of which can be implemented as a computing system. The VPS 202 can also include a connection mechanism 314, which connects the SM system 302 with the sequencing system 312; a connection mechanism 316, which connects the SM system 302 with the first DVE system 304; a connection mechanism 318, which connects the first DVE system 304 with the sequencing system 312; a connection mechanism 320, which connects the first DVE system 304 with the second DVE system 306; a connection mechanism 322, which connects the second DVE system 306 with the video source 308; a connection mechanism 324, which connects the second DVE system 306 with the sequencing system 312; a connection mechanism 326, which connects the video source 308 with the sequencing system 312; and a connection mechanism 328, which connects the scheduling system 310 with the sequencing system 312.

The first DVE system 304 can take various forms. An example character generator is the VIZ TRIO provided by Viz Rt of Bergen, Norway. Another example character generator is CASPAR CG developed and distributed by the Swedish Broadcasting Corporation (SVT).

The second DVE system 306 can take various forms, such as a production switcher. An example production switcher is the VISION OCTANE production switcher provided by Ross Video Ltd. of Iroquois, Ontario in Canada.

The video source 308 can take various forms, such as a video server, a video camera, a satellite receiver, or a DVE system. An example video server is the K2 server provided by Grass Valley of San Francisco, Calif.

The scheduling system 310 can take various forms. An example scheduling system is WO TRAFFIC provided by WideOrbit, Inc. of San Francisco, Calif. Another example scheduling system is OSI-TRAFFIC provided by Harris Corporation of Melbourne, Fla.

The sequencing system 312 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200 and/or components thereof can perform various acts and/or functions. These acts/and or functions and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring back to FIG. 3, within the VPS 202, the SM system 302 can perform various acts and/or functions related to SM content. In this disclosure, "SM content" is content that has been published on a SM platform, which is a computer-based tool that allows users to create, share, and/or exchange content (e.g., in the form of text, images, and/or videos) in virtual communities on a computer-based network such as the Internet. Examples of SM platforms include TWITTER, YOUTUBE, FACEBOOK, PERISCOPE, INSTAGRAM, MEERKAT, LINKEDIN, and GOOGLE+.

The SM system 302 can receive a SM content item and can do so in various ways. For example, the SM system 302 can receive a SM content item by obtaining it from another entity, such as a SM platform. In one example, the SM system 302 can obtain a SM content item directly from a SM platform. In another example, the SM system can obtain a SM content item from a SM platform via a SM dashboard application (e.g., TWEETDECK, CYFE, or HOOTSUITE). In some instances, a SM dashboard application can provide additional searching and browsing functionalities (e.g., based on trend analysis or analytics) that may not be provided by the SM platform itself, and/or can provide access to multiple SM platforms through a single user interface.

A SM content item can include various elements such as (i) data indicating the SM platform from which the SM content item was received, (ii) data identifying the publisher of the SM content item (e.g., an account identifier, such as a username), (iii) a profile image corresponding to the publisher of the SM content item, (iv) text published by the publisher in connection with the SM content item, (v) an image published by the publisher in connection with the SM content item, (vi) audio content published by the publisher in connection with the SM content item, (vii) video content published by the publisher in connection with the SM content item (viii) a timestamp indicating a time and/or date at which the SM content item was published on the SM platform, (ix) a location (e.g., represented by global positioning system (GPS) coordinates) of the publisher when the SM content item was published, (x) a location at which an aspect of the SM content item occurred (e.g., where video content was recorded or where a photograph was taken), (xi) a timestamp indicating when an aspect of the SM content item occurred, (xii) a number of other users associated with the publisher on a SM platform (e.g., a number of friends or followers), (xiii) an indication of how long the publisher has been a user of a SM platform, (xiv) a number of times the SM content item has been shared (e.g., retweeted) by other users of a SM platform, (xv) a number of posts by the publisher on a SM platform, and/or (xvi) any other data that can be integrated into a video program.

The SM system 302 can also store, select, and/or retrieve a SM content item, perhaps based on input received from a user (e.g., a producer or technical director) via a user interface. As such, the SM system 302 can store an obtained SM content item in a data storage unit (e.g., a data storage unit of the SM system 302), and can then receive the SM content item by selecting and retrieving it from the data storage unit.

The SM system 302 can also modify a SM content item and can do so in various ways. In one example, the SM system 302 can modify a SM content item by adding an element to the SM content item. For instance, the SM system 302 can add a unique identification (ID) number to a stored SM content item to facilitate managing the stored SM content item. In another example, the SM system 302 can modify a SM content item by removing an element of the SM content item or modifying an element of the SM content item. Among other things, this can allow the SM system 302 to remove vulgarities, personal information, and/or extraneous information that is not suitable or desirable for integration into a video program.

The SM system 302 can also transmit a SM content item to another entity, such as the first DVE system 304.

The first DVE system 304 can perform various acts and/or functions related to a DVE, perhaps based on input received from a user (e.g., a producer or technical director) via a user interface. For example, the first DVE system 304 can perform a set of steps based on a DVE template to generate and/or output video content. This is sometimes referred to in the industry as "executing a DVE."

The first DVE system 304 can create and/or modify a DVE template. Further, the first DVE system 304 can store and/or retrieve a DVE template. As such, the first DVE system 304 can store a DVE template in a data storage unit (e.g., a data storage unit of the first DVE system 304), and can then receive the DVE template by selecting and retrieving it from the data storage unit.

In some instances, the first DVE system 304 can use the DVE template and content to generate and/or output video content that includes the content. The first DVE system 304 can receive content to use for this purpose in various ways. For example, the first DVE system 304 can receive content, such as a SM content item, from another entity, such as the SM system 302. In another example, the first DVE system 304 can receive content by selecting and retrieving it from a data storage unit (e.g., a data storage unit of the SM system 302).

A DVE template can specify how the first DVE system 304 is to receive content. In one example, a DVE template can do so by specifying that the first DVE system 304 is to receive content on a particular input of the first DVE system 304 (e.g., an input that maps to a particular entity, such as the SM system 302). In another example, a DVE template can do so by specifying that the first DVE system 304 is to receive content by retrieving it from a particular location of a particular data storage unit (e.g., a data storage unit of the first DVE system 304).

After the first DVE system 304 generates and/or outputs video content, the first DVE system 304 can transmit the video content to another entity, such as the second DVE system 306, and/or can store the video content in a data storage unit (e.g., a data storage unit of the first DVE system 304). As such, in one example, the first DVE system 304 can receive a SM content item, can use the content to generate and/or output video content that includes the SM content item, and can transmit the video content to the second DVE system 306.

A DVE template can be configured in various ways and can specify various aspects of a DVE. For example, the DVE template can specify a set of ordered steps and various timing aspects, such as when each step is to start being performed and for how long each step is to be performed. The steps can relate to retrieving and/or arranging content within a specified frame or specified frames of video content. The DVE template can specify that a given step is to start being performed at a predefined time, or that a given step is to start being performed at the occurrence of, or after a time offset from the occurrence of, a particular event, such as the conclusion of the performance of a previous step. In another example, the occurrence of the particular event can be the receipt of input from a user via a user interface. In another example, the occurrence of the particular event can be the receipt of an instruction from the sequencing system 312.

To illustrate various aspects of a DVE, an example DVE will now be discussed. In connection with this example, the first DVE system 304 can execute a DVE that causes the first DVE system 304 to generate video content showing overlay images A, B, C, and D scrolling from right to left over a background image. FIGS. 4A-4D are simplified depictions of example frames of the generated video content at various states of the DVE execution process.

Figure 4A:
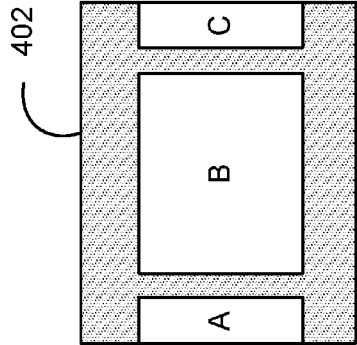
FIG. 4A is a simplified diagram of an example frame of video content, resulting from the performance of a first step in connection with a DVE.

During a first time period, the first DVE system 304 can perform a first step that involves "moving" from right to left, images A and B until image A is positioned over a center region of the background image. FIG. 4A is a simplified depiction of an example frame 400 at the end of the first time period.

Figure 4B:
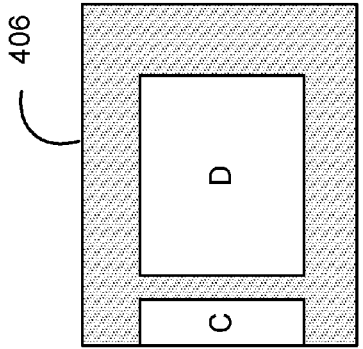
FIG. 4B is a simplified diagram of an example frame of video content, resulting from the performance of a second step in connection with the DVE.

During a next, second time period, the first DVE system 304 can perform a second step that involves "moving" from right to left, images A, B, and C until image B is positioned over the center region of the background image. FIG. 4B is a simplified depiction of an example frame 402 at the end of the second time period.

Figure 4D:
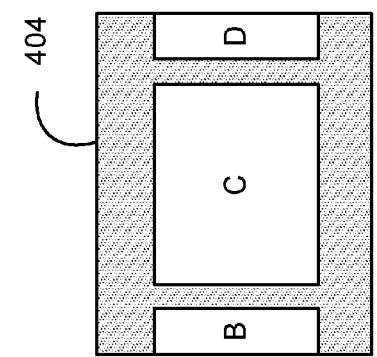
FIG. 4D is a simplified diagram of an example frame of video content, resulting from the performance of a fourth step in connection with the DVE.
Figure 4C:
FIG. 4C is a simplified diagram of an example frame of video content, resulting from the performance of a third step in connection with the DVE.

During a next, third time period, the first DVE system 304 can perform a third step that involves "moving" from right to left, images A, B, C, and D until image C is positioned over the center region of the background image. FIG. 4C is a simplified depiction of an example frame 404 at the end of the third time period.

During a next, fourth time period, the first DVE system 304 can perform a fourth step that involves "moving" from right to left, images B, C, and D until image D is positioned over the center region of the background image. FIG. 4D is a simplified depiction of an example frame 406 at the end of the fourth time period.

As noted above, the DVE template can specify various timing aspects, such as when each step is to start being performed and for how long each step is to be performed. As such, in one example, the DVE template can specify that each step is to be performed for two seconds. Further, the DVE template can specify that the first DVE system 304 is to start performing the first step at a particular time, and that each of steps two, three, and four are to start being performed five seconds after the performance of the previous step has concluded.

As such, at the start time, the first DVE system 304 can begin performing the first step. Two second later, the first DVE system 304 can conclude performing the first step (resulting in the generation of frame 400). Five seconds later, the first DVE system 304 can begin performing the second step. Two second later, the first DVE system 304 can conclude performing the second step (resulting in the generation of frame 402). Five seconds later, the first DVE system 304 can begin performing the third step. Two second later, the first DVE system 304 can conclude performing the third step (resulting in the generation of frame 404). Five seconds later, the first DVE system 304 can begin performing the fourth step. Two second later, the first DVE system 304 can conclude performing the fourth step (resulting in the generation of frame 406). Collectively, this results in the each of the images A, B, C, and D scrolling from left to right, but with each image "pausing" in the center region for five seconds before continuing to move left.

It should be appreciated that the first DVE system 304 can execute a wide variety of different types of DVEs, and can thus generate a wide variety of different types of video content. Among other things, a DVE can involve inserting, moving, removing, overlaying, and/or scaling various different types of content, such as text, images, and/or video content, to generate resulting video content.

Like the first DVE system 304, the second DVE system 306 can perform various acts and/or functions related to a DVE, perhaps based on input received from a user (e.g., a producer or technical director) via a user interface. For example, the second DVE system 306 can perform the acts and/or functions described above in connection with the first DVE system 304, but varied as appropriate for use with the second DVE system 306 instead of the first DVE system 304.

Generally, the first DVE system 304 executes certain types of DVEs, and the second DVE system 306 executes other types of DVEs, namely those that are more suited to be executed further downstream in the video production process. However, various DVE-related configurations are possible. For example, either the first DVE system 304 or the second DVE system 306 can perform the acts and/or functions described herein as being performed by the other of the two systems. In another example, the VPS 202 can instead include a single DVE system that provides the functionality of both the first DVE system 304 and the second DVE system 306.

The second DVE system 306 can receive content in various ways. For example, the second DVE system 306 can receive content from another entity, such as the video source 308 and/or the first DVE system 304. In another example, the second DVE system 306 can receive content by selecting and retrieving it from a data storage unit (e.g., a data storage unit of the second DVE system 306).

The second DVE system 306 can execute a DVE based on a DVE template. The DVE template can specify how the second DVE system 306 is to receive content. In one example, the DVE template can do so by specifying that the second DVE system 306 is to receive content on a particular input of the second DVE system 306 (e.g., an input that maps to a particular entity, such as the video source 308 or the first DVE system 304). In another example, the DVE template can do so by specifying that the second DVE system 306 is to receive content by retrieving it from a particular location of a particular data storage unit (e.g., a data storage unit of the second DVE system 306).

As noted above, a DVE template can be configured in various ways. As such, the second DVE system 306 can execute various types of DVEs. In one example, a DVE template can specify that the second DVE system 306 is to receive first video content from the video source 308 and second video content from the first DVE system 304, and is to overlay the received second video content on a portion of the received first video content, thereby generating third video content.

Figure 5A:
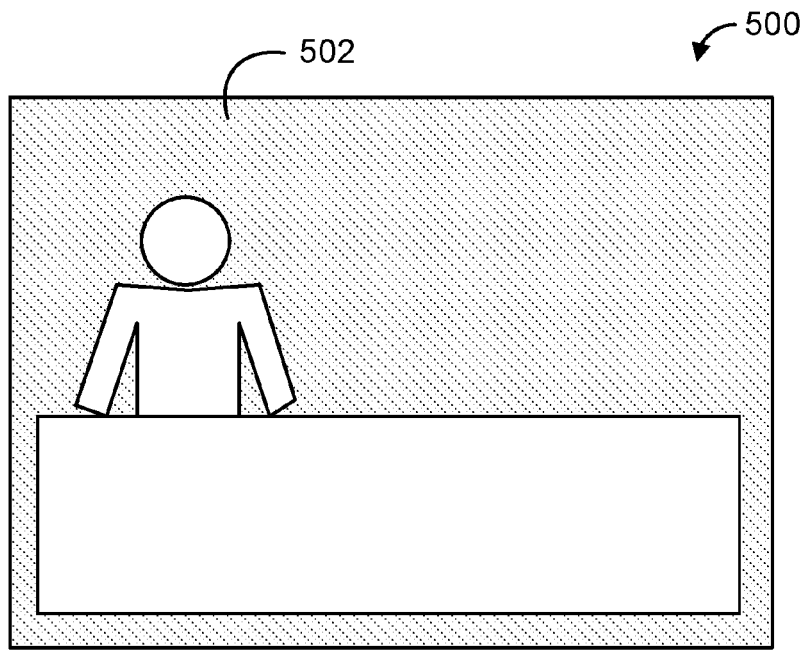
FIG. 5A is a simplified diagram of an example frame of video content, without content overlaid thereon.
Figure 5B:
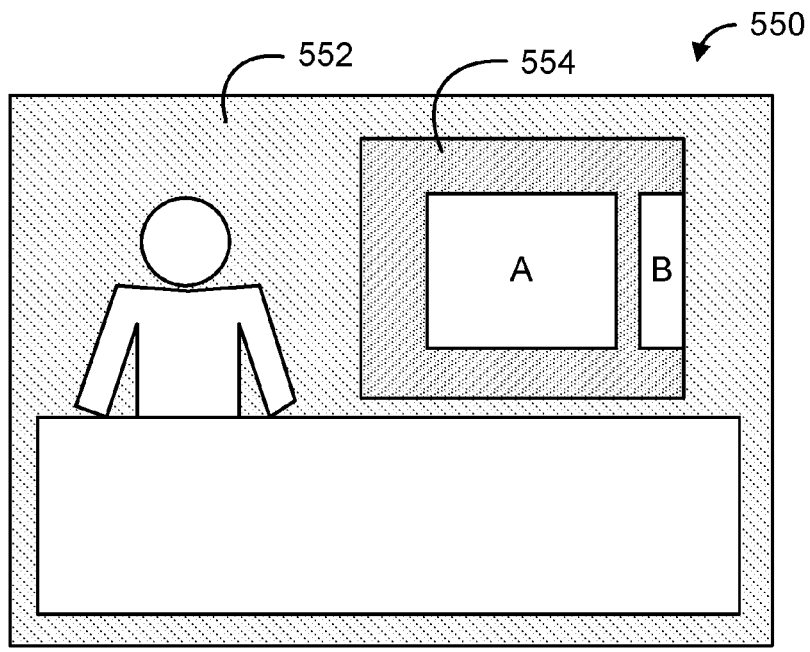
FIG. 5B is a simplified diagram of another example frame of video content, with content overlaid thereon.

FIGS. 5A and 5B help illustrate the concept of overlaying video content on other video content. FIG. 5A is a simplified depiction of an example frame 500 of video content. Frame 500 shows content 502, which is a scene where a news anchor is discussing a news story, but does not include other content overlaid on content 502. For comparison, FIG. 5B is a simplified depiction of another example frame 550 of video content. Frame 550 includes content 552, which is also a scene where a news anchor is discussing a news story, but further includes other content 554 overlaid on a portion of the content 552. In this example, the content 554 shows scrolling images related to the news story, and is overlaid on a portion of the scene where the news anchor is discussing the news story.

After the second DVE system 306 generates and/or outputs the video content, the second DVE system 306 can transmit the video content to another entity, such as the VBS 204, and/or can store the video content in a data storage unit (e.g., a data storage unit of the second DVE system 306).

As discussed above, in one example, the second DVE system 306 can receive first video content that includes a SM content item, and can use the first video content to generate and/or output second video content that also includes the SM content item. The second video content can then serve as or be part of a video program. As such, this is an example way in which the VPS 202 can integrate A SM content item into a video program.

However, the VPS 202 can also integrate A SM content item into a video program in other ways. For example, in the case where the video source 308 is a video camera, the first DVE system 304 can generate video content and can transmit the generated video content to a display device located within a field of the view of the video camera. This can allow the video camera to capture video content that includes the SM content item as it is displayed on the display device. Then, by integrating the captured video content into a video program, the VPS 202 can therefore also integrate the SM content item displayed on the display device, into the video program.

In one example, the display device can be integrated with a touch-sensitive panel, which can allow a user (e.g., a news anchor) to interact with the content. To facilitate the user's interaction with the content, the display device and/or related components can perform particular acts and/or functions in response to a user providing certain touch commands.

In one example, the display device can initially display multiple small tiles, each representing a different content item. The position and ordering of the small tiles can be determined by a DVE template, which can specify that certain touch commands cause the display device to perform certain acts and/or functions in connection with the displayed content items. For example, if a user taps on one of the small items a first time, the display device can show the content item in an enlarged view and perhaps show additional elements of, or information associated with, the content item. As the user interacts with the content items displayed on the display device, the video camera can generate video content including these interactions and thereby integrate the content items into the video program.

The scheduling system 310 can perform various acts and/or functions related to the scheduling of video content production, perhaps based on input received from a user (e.g., a producer or technical director) via a user interface. For example, the scheduling system 310 can create and/or modify a program schedule. Further, the scheduling system 310 can store and/or retrieve a program schedule. As such, the scheduling system 310 can store a program schedule in a data storage unit (e.g., a data storage unit of the scheduling system 310), and can then receive the program schedule by selecting and retrieving it from the data storage unit. The scheduling system 310 can also transmit a program schedule to another entity, such as the sequencing system 312.

The sequencing system 312 can process records in the program schedule perhaps based on input received from a user (e.g., a producer or technical director) via a user interface. This can cause the sequencing system 312 to control one or more other components of the VPS 202 to facilitate the VPS 202 generating and/or outputting video content, which can serve as or be part of a video program. For example, the sequencing system 312 can control the video source 308, the SM system 302, the first DVE system 304, and/or the second DVE system 306 to perform various acts and/or functions, such as those described in this disclosure.

The sequencing system 312 can receive a program schedule in various ways. For example, the sequencing system 312 can do so by receiving it from another entity, such as the scheduling system 310. In another example, the sequencing system 312 can do so by selecting and retrieving it from a data storage unit (e.g., a data storage unit of the scheduling system 310).

A program schedule (sometimes referred to in the industry as a "rundown") serves as a schedule or outline of a video program and can include multiple records. A video program can be conceptually divided into multiple logically-separated portions, sometimes referred to in the industry as "stories." As such, each portion of the video program can be represented by a separate record of the program schedule. In some cases, each record can also include one or more sub-records. Each record (including a sub-record) can include various types of data.

FIG. 6 is a simplified diagram of an example program schedule 600.

The program schedule 600 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video content item identifier, a duration, and a DVE template identifier (which can serve as an instruction to execute a corresponding DVE).

A video content item can consist of logically-related video content. For example, a video content item can be video content that covers a particular news story.

As shown in FIG. 5, the first record specifies a story title of STORY A, a video content item identifier of VCI ID A, a duration of 00:02:00:00 (in hours::minutes::seconds::frames format), and DVE template identifiers of DVE/T ID A and DVE/T ID B. As such, upon the sequencing system 312 processing the first record, the sequencing system 312 can cause the video source 308 to playout a video content item identified by the identifier VCI ID A for two minutes, and can further cause the first DVE system 304 to execute a DVE based on the DVE template identified by the identifier DVE/T ID A, and can further cause the second DVE system 306 to execute a DVE based on the DVE template identified by the identifier DVE/T ID B.

The program schedule 600 has been greatly simplified for the purposes of illustrating certain features. In practice, a program schedule is likely to include significantly more data.

In some instances, the sequencing system 312 can process a next record in the program schedule based on a trigger event. In one example, the trigger event can be the sequencing system 312 completing one or more actions related to a current record in the program schedule. In another example, the trigger event can be the sequencing system 312 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

As noted above, the VPS 202 can retrieve a SM content item from a SM platform. In some instances, a SM server (or other computing system associated with a SM platform) can transmit the SM content item to the VPS 202 by transmitting a data stream representing the SM content item to the VPS 202. As such, the VPS 202 can receive the SM content item by receiving the data stream representing the SM content item.

As an example, the VPS 202 can receive the SM content item as streaming video, audio, and/or closed-caption text by receiving the data stream containing respective video data, audio data, and/or closed-caption data. Within examples, the VPS 202 can begin processing the SM content item and/or integrating the SM content item into a video program while receiving the data stream from the SM server (i.e., before the entire data stream is received by the VPS 202 from the SM server). In an example, the VPS 202, a component thereof, or another computing system can integrate the SM content item into the video program by streaming the data stream from the SM server over a communication network while executing a DVE.

Figure 7:
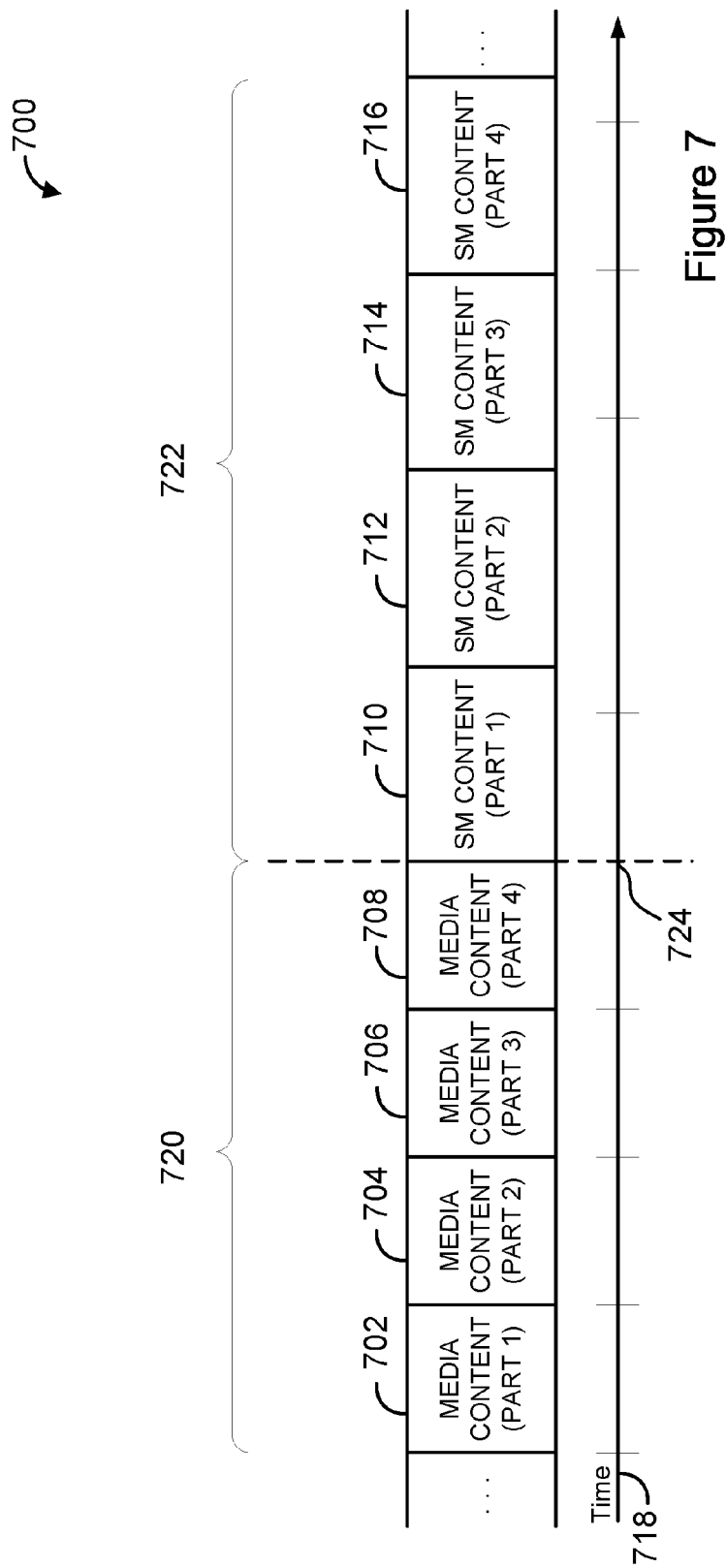
FIG. 7 is a simplified diagram of an example data stream.

In some instances though, the data stream can represent more than just the SM content item. For example, the data stream can also include another media content item (e.g., an advertisement), which may precede the SM content item in the data stream. FIG. 7 is a simplified diagram of an example data stream 700, which can help illustrate this concept. In discussing the data stream 700, reference will be made to a computing system that receives and processes the data stream 700.

As shown in FIG. 7, the data stream 700 includes at least eight blocks of data namely, a first block 702, a second block 704, a third block 706, a fourth block 708, a fifth block 710, a sixth block 712, a seventh block 714, and an eighth block 716. The computing system can receive the blocks in order from left to right, as indicated by an arrow representing time 718 in FIG. 7. As such, the computing system can receive the first block 702, and then the second block 704, and so on.

The first block 702, the second block 704, the third block 706, and the fourth block 708 include data representing a media content item 720. The fifth block 710, the sixth block 712, the seventh block 714, and the eighth block 716 include data representing a SM content item 722. The data stream 700 thus represents the media content item 720 followed by the SM content item 722. The point in the data stream 700 at which the media content item 720 ends and the SM content item 722 begins is a demarcation point 724. In FIG. 7, the demarcation point 724 between the media content item 720 and the SM content item 722 is thus a point in the data stream 700 between the fourth block 708 and the fifth block 710.

Although the data stream 700 represents the media content item 720 followed by the SM content item 722, the computing system can advantageously integrate into a video program the SM content item 722 without the media content item 720. To do so, the computing system can determine the demarcation point 724 between the media content item 720 and the SM content item 722. The computing system can then use the demarcation point 724 to cue up the data stream 700 to the start of the SM content item 722 and integrate the SM content item 722 into the video program without the preceding media content item 720.

Within examples, the computing system can determine the demarcation point 724 between the media content item 720 and the SM content item 722 based on a data rate of the data stream 700 (e.g., a bit rate of the data stream 700). For instance, the data rate of the data stream 700 for the media content item 720 can be different than the data rate of the data stream 700 for the SM content item 722. The computing system can thus detect a change in the data rate of the data stream 700 and determine the demarcation point 724 based on the detected change.

For example, as noted above, the data stream 700 in FIG. 7 has blocks 702, 704, 706, 708 of data for the media content item 720 and blocks 710, 712, 714, 716 of data for the SM content item 722. In FIG. 7, each block represents the same amount of data. As shown in FIG. 7, the blocks 702, 704, 706, 708 for the media content item 720 are each transmitted over a lesser amount of time than each of the blocks 710, 712, 714, 716 for the SM content item 722. Thus, in FIG. 7, the data rate of the media content item 720 is higher than the data rate of the SM content item 722, and the demarcation point 724 is at the point in data stream 700 at which the data rate changes from the higher data rate of the media content item 720 to the lower data rate of the SM content item 722. In another example, the data rate of the media content item 720 can be lower than the data rate of the SM content item 722.

In general, the data rate of the media content item 720 can be different than the data rate of the SM content item 722 for various reasons. As an example, the data rate of the media content item 720 can be different than the data rate of the SM content item 722 due to only one of the media content item 720 and the SM content item 722 containing closed-caption data. As another example, the data rate of the media content item 720 can be different than the data rate of the SM content item 722 due to the media content item 720 and the SM content item 722 including video and/or audio of a different resolution and/or quality. For instance, in a scenario in which the SM content item 722 is a standard-definition video and the media content item 720 is a high-definition advertisement, the data rate of the SM content item 722 can be lower than the data rate of the media content item 720. Whereas, in a scenario in which the SM content item 722 is a 4K resolution video and the media content item 720 is a 1080i resolution video, the data rate of the SM content item 722 can be higher than the data rate of the media content item 720.

In one example, the computing system can determine a change in the data rate by determining a first amount of data received by the computing system over a first window of time, and a second amount of data received by the computing system over a subsequent, second window of time. In an implementation, the first window of time and the second window of time can be the same amount of time such as, for example, two seconds of time. The computing system can then compare the first amount of data to the second amount of data. Based on the comparison, the computing system can determine a parameter, which indicates how different the second amount of data is relative to the first amount of data. For example, the parameter can be a percentage of change between the second amount of data and the first amount of data.

The computing system can then compare the determined parameter to a threshold value to determine whether a change in the data rate occurred. For instance, the computing system can compare the parameter to the threshold value to determine whether the data rate changed by more than the threshold value. As an example, the computing system can determine that the change in data rate occurred responsive to the computing system determining that the parameter is equal to or greater than 17%.

In one implementation, responsive to the computing system determining that a change in the data rate occurred, the computing system can determine that demarcation point is the point in time between the first window time and the second window of time. In another implementation, responsive to the computing system determining that a change in the data rate occurred, the computing system can re-analyze one or more times the data received by the computing system during the first window of time and the second window of time using smaller windows of time to more precisely determine the demarcation point.

In another example, the computing system can determine that a change in the data rate occurred by analyzing the data stream received by the computing system in groups of N bits of data, where N is an integer value. For instance, for each group of N bits, the computing system can determine an amount of time over which the computing system received the group of N bits. The computing system can then determine the data rate for each group of N bits based on the determined amount of time for receiving the group of N bits. The computing system can then compare the data rates of consecutive groups of N bits to determine whether the data rate changed by more than a threshold value as described above.

In operation, the computing system can select the SM content item 722 on the SM platform, perhaps based on input received from a user (e.g., a producer or technical director) via a user interface. Responsive to the selection, the computing system can receive the data stream 700 representing the media content item 720 followed by the SM content item 722. While receiving the data stream 700, the computing system can perform an analysis of the data rate of the data stream 700. In one example, the computing system can play the media content item 720 and the SM content item 722 using a virtual player and, while playing the media content item 720 and the SM content item 722 using the virtual player, the computing system can determine the data rate of the data stream 700.

Based on the analysis of the data rate, the computing system can determine the demarcation point 724 between the media content item 720 and the SM content item 722. For example, as noted above, the computing system can determine the demarcation point 724 by detecting a change in the data rate of the data stream 700. Responsive to the computing system detecting the change in the data rate, the computing system can determine a point in the data stream 700 at which the change was detected. The computing system can then determine that the point in the data stream 700 at which the change was detected is the demarcation point 724 between the media content item 720 and the SM content item 722. Responsive to determining the demarcation point 724, the computing system can store the demarcation point 724 in a data storage unit for later retrieval, as described below.

In one implementation, the computing system can detect the change in the data rate of the data stream 700 by detecting that the data rate changed by more than a threshold value. For example, the threshold value can be a percentage of change of the data rate. For instance, in a scenario in which the threshold value is 25%, the computing system can detect the change in data rate responsive to the computing system detecting that the data rate changed by more than 25%. As another example, the threshold value can be a percentage of change selected from a range of approximately 10% and approximately 50%.

In another implementation, the computing system can determine the demarcation point 724 by analyzing multiple component parts of the data stream 700 with respect to one or more threshold values. For instance, in an example in which the data stream 700 includes audio data and video data, the computing system can analyze the data stream 700 by determining (i) a first data rate for the audio data of the data stream 700, and (ii) a second data rate for the video data of the data stream 700. Based on the analysis, the computing system can detect a change in (i) the first data rate for the audio data by more than a first threshold value or (ii) the second data rate for the video data by more than a second threshold value, whichever occurs first. In one example, the first threshold value can be approximately 15% and the second threshold value can be approximately 25%. Responsive to detecting the change, the computing system can determine the point at which the change was detected and determine that the point at which the change was detected is the demarcation point 724.

As another example, the data stream 700 can include audio data, video data, and closed-caption data. In this example, the computing system can analyze the data stream 700 by determining (i) a first data rate for the audio data of the data stream 700, (ii) a second data rate for the video data of the data stream 700, and (iii) whether closed-caption data is present in the data stream 700. Based on the analysis, the computing system can detect a change in (i) the first data rate for the audio data by more than a first threshold value, (ii) the second data rate for the video data by more than a second threshold value, or (iii) a presence of the closed-caption data, whichever occurs first. Responsive to detecting the change, the computing system can determine the point at which the change was detected and determine that the point at which the change was detected is the demarcation point 724.

In the examples above, the computing system can determine that the demarcation point 724 is the point in the data stream 700 at which the change was detected. In one implementation, the computing system unconditionally determines that the demarcation point 724 is the point at which the change was detected. As such, the computing system determines that the demarcation point 724 is the point at which the change was detected immediately at the time the computing system detects the change.

In another implementation, the computing system can determine that the demarcation point 724 is the point in the data stream 700 at which the change was detected responsive to the computing system further determining that the data rate remained changed by more than the threshold value for more than a predetermined amount of time. For example, responsive to the computing system detecting the change in the data rate, the computing system can record the point in the data stream 700 at which the change was detected and continue to analyze the data rate for the predetermined amount of time. If the computing system determines that the data rate did not remain changed by more than the threshold value for the predetermined amount of time, the computing system determines that the recorded point in the data stream 700 is not the demarcation point 724 and the computing system continues to perform the analysis of the data rate to determine the demarcation point 724.

Whereas, if the computing system determines that the data rate remained changed by more than the threshold value for more than the predetermined amount of time, the computing system can determine that the recorded point in the data stream 700 is the demarcation point 724. Responsive to determining that the recorded point in the data stream 700 is the demarcation point 724, the computing system can move backward in the data stream 700 by the predetermined amount of time to the demarcation point 724. This can facilitate, for example, playing the SM content item 722 in a preview window while preparing a program schedule and/or cueing up the SM content item 722 for integration into a video program.

In an example, the predetermined amount of time can be approximately five seconds. In another example, the predetermined amount of time can be approximately ten seconds. In a further example, the predetermined amount of time can be approximately 0.10 seconds to approximately one minute.

As noted above, responsive to the computing system determining the demarcation point 724, the computing system can use the demarcation point 724 to integrate into the video program the SM content item 722 without the media content item 720. For instance, the computing system can use the demarcation point 724 to cue up the data stream 700 to the start of the SM content item 722 in the data stream 700 and then, after cueing up the data stream 700, the computing system can integrate the data stream 700 into the video program. In one example, the computing system can receive the data stream 700 in a cache memory, use a video disk control protocol (VDCP) to cue up the demarcation point 724 in the data stream 700, and then use VDCP to play the data stream 700 while executing a DVE. In another example, the computing system can store the SM content item 722 and the demarcation point 724 in a data storage unit so that the computing system can later integrate the stored SM content item 722 into the video program.

Also, as noted above, the computing system can store the demarcation point 724 in a data storage unit. This can, among other things, facilitate creating a program schedule and later executing the program schedule to integrate the SM content item 722 into the video program. For example, the computing system can retrieve the data stream 700 a first time, process the data stream 700 to determine the demarcation point 724, and store the demarcation point 724 as a part of a process for obtaining the SM content item 722 and preparing the program schedule. Then, when the computing system later prepares to execute the program schedule for the video program, the computing system can (i) retrieve the data stream 700 from the SM server a second time, (ii) retrieve the demarcation point 724 from the data storage unit, and (iii) use the demarcation point 724 to cue up the data stream 700 to the demarcation point 724. In this way, the computing system can be prepared to integrate the SM content item 722 into the video program when, for example, the sequencing system processes a record in the program schedule including the SM content item 722.

Figure 8:
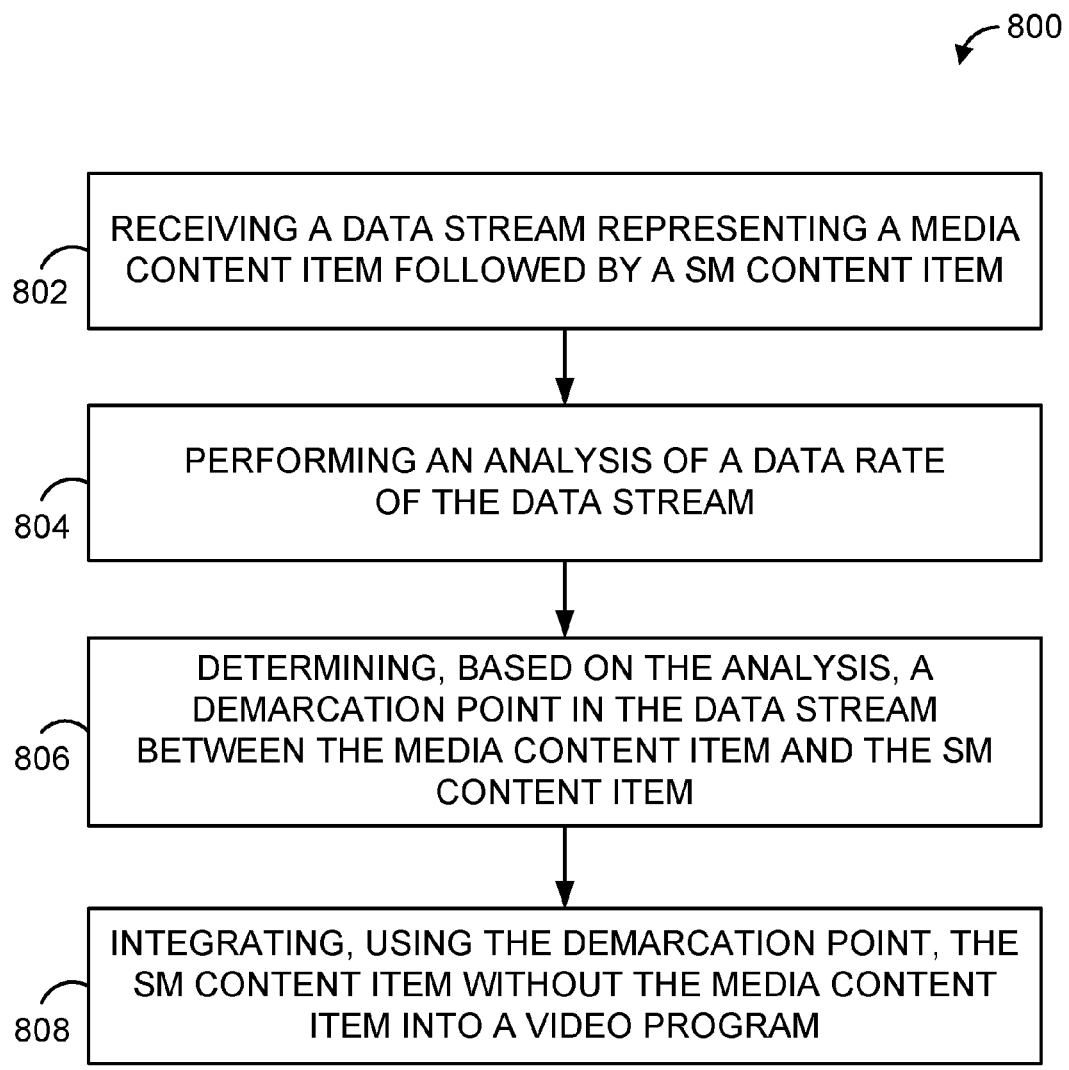
FIG. 8 is a flow chart of an example method.

FIG. 8 is a flow chart illustrating an example method 800. At block 802, the method 800 can include receiving, by a computing system, a data stream representing a media content item followed by a SM content item. At block 804, the method 800 also includes performing, by the computing system, an analysis of a data rate of the data stream. At block 806, the method 800 further includes determining, by the computing system based on the analysis, a demarcation point in the data stream between the media content item and the SM content item. At block 808, the method 800 includes integrating, by the computing system using the demarcation point, the SM content item without the media content item into a video program.

Figure 9:
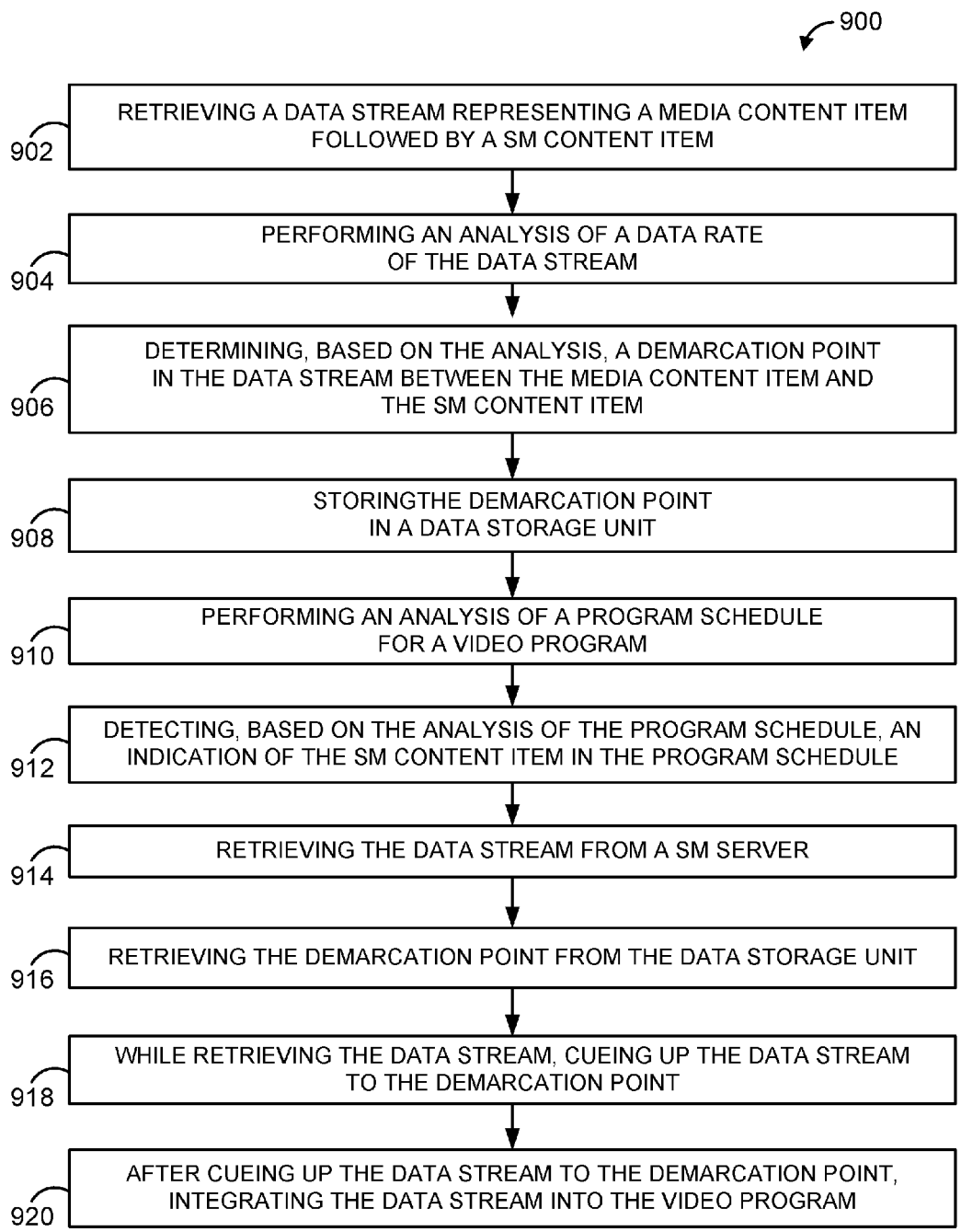
FIG. 9 is a flow chart of an example method.

FIG. 9 is a flow chart illustrating another example method 900. At block 902, the method 900 can include retrieving, by a computing system, a data stream representing a media content item followed by a SM content item. At block 904, the method 900 also includes performing, by the computing system, an analysis of a data rate of the data stream. At block 906, the method 900 further includes determining, by the computing system based on the analysis, a demarcation point in the data stream between the media content item and the SM content item. At block 908, the method 900 includes storing the demarcation point in a data storage unit.

At block 910, the method 900 includes analyzing a program schedule for a video program. The program schedule can include a record that specifies, among other information, the SM content item for at least a portion of the video program. At block 912, the method 900 also includes detecting, based on the analysis of the program schedule at block 910, an indication of the SM content item in the program schedule. At block 914, responsive to detecting the indication of the SM content item at block 912, the method 900 includes retrieving the data stream from a SM server. At block 916, the method 900 includes retrieving the demarcation point from the data storage unit. At block 918, while retrieving the data stream at block 914, the method 900 also includes cueing up the data stream to the demarcation point retrieved at block 916. At block 920, after cueing up the data stream to the demarcation point at block 918, the method 900 includes integrating the data stream into the video program.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
receiving, by a computing system, a data stream representing a media content item followed by a social media (SM) content item, wherein the data stream was transmitted with a first data rate for the media content item and a second data rate for the SM content item, wherein the first data rate is different than the second data rate;
performing, by the computing system, an analysis of a data rate of the data stream, wherein the data rate of the data stream includes the first data rate for the media content item and the second data rate for the SM content item;
determining, by the computing system based on the analysis, a demarcation point in the data stream between the media content item and the SM content item; and
integrating, by the computing system using the demarcation point, the SM content item without the media content item into a video program.

2. The method of claim 1, wherein determining the demarcation point comprises:
detecting a change in the data rate of the data stream;
responsive to detecting the change in the data rate, determining a point in the data stream at which the change was detected; and
determining that the point in the data stream at which the change was detected is the demarcation point between the media content item and the SM content item.

3. The method of claim 2, wherein detecting the change in the data rate comprises determining that the data rate changed by more than a threshold value.

4. The method of claim 3, wherein determining that the point in the data stream is the demarcation point is responsive to determining that the data rate remained changed by more than the threshold value for more than a predetermined amount of time.

5. The method of claim 4, further comprising responsive to determining that the data rate remained changed by more than the threshold value for more than the predetermined amount of time, moving backward in the data stream by the predetermined amount of time to the demarcation point.

6. The method of claim 2, wherein only one of the media content item and the SM content item contains closed-caption data, and wherein detecting the change in the data rate is responsive to a change in a presence of the closed-caption data in the data stream.

7. The method of claim 1, wherein the data stream comprises audio data and video data, and wherein determining the demarcation point comprises:
detecting a change in (i) the data rate for the audio data by more than a first threshold value or (ii) the data rate for the video data by more than a second threshold value, whichever occurs first;
responsive to detecting the change, determining a point in the data stream at which the change was detected; and
determining that the point in the data stream at which the change was detected is the demarcation point between the media content item and the SM content item.

8. The method of claim 1, wherein the data stream comprises audio data, video data, and closed-caption data, and
wherein determining the demarcation point comprises:
detecting a change in (i) the data rate for the audio data by more than a first threshold value, (ii) the data rate for the video data by more than a second threshold value, or (iii) a presence of closed-caption data, whichever occurs first;
responsive to detecting the change, determining a point in the data stream at which the change was detected; and
determining that the point in the data stream at which the change was detected is the demarcation point between the media content item and the SM content item.

9. The method of claim 1, wherein performing the analysis comprises:
playing, by the computing system, the media content item and the SM content item using a virtual player; and while playing the media content item and the SM content item in the virtual player, determining the data rate of the data stream.

10. The method of claim 1, wherein integrating the SM content item into the video program comprises executing a digital-to-video effect (DVE).

11. The method of claim 1, wherein integrating the SM content item into the video program comprises streaming the data stream from a SM content provider over a communications network.

12. The method of claim 11, further comprising:
analyzing a program schedule for the video program;
detecting an indication of the SM content item in the program schedule;
responsive to detecting the indication of the SM content item, retrieving the data stream from the SM content provider;
while receiving the data stream from the SM content provider, cueing up the data stream to the demarcation point; and
after cueing up the data stream to the demarcation point, integrating the data stream into the video program.

13. A non-transitory computer-readable medium having stored thereon, program instructions that when executed by a processor, cause a computing system to perform a set of acts comprising:
receiving, by the computing system, a data stream representing a media content item followed by a social media (SM) content item, wherein the data stream was transmitted with a first data rate for the media content item and a second data rate for the SM content item, wherein the first data rate is different than the second data rate;
performing, by the computing system, an analysis of a data rate of the data stream, wherein the data rate of the data stream includes the first data rate for the media content item and the second data rate for the SM content item;
determining, by the computing system based on the analysis, a demarcation point in the data stream between the media content item and the SM content item; and
integrating, by the computing system using the demarcation point, the SM content item without the media content item into a video program.

14. The non-transitory computer-readable medium of claim 13, wherein determining the demarcation point comprises:
detecting a change in the data rate of the data stream;
responsive to detecting the change in the data rate, determining a point in the data stream at which the change was detected; and
determining that the point in the data stream at which the change was detected is the demarcation point between the media content item and the SM content item.

15. The non-transitory computer-readable medium of claim 13, wherein the data stream comprises audio data and video data, and wherein determining the demarcation point comprises:
detecting a change in (i) the data rate for the audio data by more than a first threshold value or (ii) the data rate for the video data by more than a second threshold value, whichever occurs first;
responsive to detecting the change, determining a point in the data stream at which the change was detected; and
determining that the point in the data stream at which the change was detected is the demarcation point between the media content item and the SM content item.

16. The non-transitory computer-readable medium of claim 13, wherein the acts further comprise:
analyzing a program schedule for the video program;
detecting an indication of the SM content item in the program schedule;
responsive to detecting the indication of the SM content item, retrieving the data stream from a SM content provider;
while retrieving the data stream from the SM content provider, cueing up the data stream to the demarcation point;
after cueing up the data stream to the demarcation point, integrating the data stream into the video program.

17. A computing system configured for performing a set of acts comprising:
receiving, by the computing system, a data stream representing a media content item followed by a social media (SM) content item, wherein the data stream was transmitted with a first data rate for the media content item and a second data rate for the SM content item, wherein the first data rate is different than the second data rate;
performing, by the computing system, an analysis of a data rate of the data stream, wherein the data rate of the data stream includes the first data rate for the media content item and the second data rate for the SM content item;
determining, by the computing system based on the analysis, a demarcation point in the data stream between the media content item and the SM content item; and
integrating, by the computing system using the demarcation point, the SM content item without the media content item into a video program.

18. The computing system of claim 17, wherein determining the demarcation point comprises:
detecting a change in the data rate of the data stream;
responsive to detecting the change in the data rate, determining a point in the data stream at which the change was detected; and
determining that the point in the data stream at which the change was detected is the demarcation point between the media content item and the SM content item.

19. The computing system of claim 18, wherein detecting the change in the data rate comprises determining that the data rate changed by more than a threshold value, and
wherein determining that the point in the data stream is the demarcation point is responsive to determining that the data rate remained changed by more than the threshold value for more than a predetermined amount of time.

20. The computing system of claim 17, wherein the data stream comprises audio data, video data, and closed-caption data, and
wherein determining the demarcation point comprises:
detecting a change in (i) the data rate for the audio data by more than a first threshold value, (ii) the data rate for the video data by more than a second threshold value, or (iii) a presence of closed-caption data, whichever occurs first;
responsive to detecting the change, determining a point in the data stream at which the change was detected; and determining that the point in the data stream at which the change was detected is the demarcation point between the media content item and the SM content item.

* * * * *